United States Patent [19]

Hongyo et al.

[11] Patent Number: 5,346,971
[45] Date of Patent: Sep. 13, 1994

[54] AQUEOUS SUSPENSION POLYMERIZATION OF 1,3-BUTADIENE TO PRODUCE SYNDIOTACTIC-1,2-POLYBUTADIENE

[75] Inventors: Kenichi Hongyo; Michinori Suzuki; Kazuhiro Akikawa, all of Ichihara, Japan

[73] Assignee: UBE Industries, Ltd., Yamaguchi, Japan

[21] Appl. No.: 59,293

[22] Filed: May 11, 1993

[30] Foreign Application Priority Data

| | | | |
|---|---|---|---|
| May 15, 1992 | [JP] | Japan | 4-165284 |
| May 15, 1992 | [JP] | Japan | 4-165285 |
| Oct. 9, 1992 | [JP] | Japan | 4-271361 |
| Oct. 13, 1992 | [JP] | Japan | 4-274288 |

[51] Int. Cl.$^5$ .................. C08F 2/18; C08F 136/06
[52] U.S. Cl. ........................ 526/94; 526/91; 526/93; 526/140; 526/141; 526/142; 526/144; 526/335
[58] Field of Search ............ 526/92, 93, 140, 91, 526/94, 144, 141, 142

[56] References Cited

U.S. PATENT DOCUMENTS 5,011,896  4/1991  Bell et al. .................. 526/335 X

FOREIGN PATENT DOCUMENTS

| | | |
|---|---|---|
| 0152175 | 8/1985 | European Pat. Off. ........ 526/92 |
| 60-147410 | 8/1985 | Japan . |
| 60-147411 | 8/1985 | Japan . |
| 61-23610 | 2/1986 | Japan . |
| 61-23611 | 2/1986 | Japan . |
| 61-23637 | 2/1986 | Japan . |
| 61-31407 | 2/1986 | Japan . |
| 61-69818 | 4/1986 | Japan . |
| 61-108653 | 5/1986 | Japan . |
| 61-29364B2 | 7/1986 | Japan . |
| 61-29365B2 | 7/1986 | Japan . |
| 61-151217 | 7/1986 | Japan . |
| 62-27405 | 2/1987 | Japan . |

OTHER PUBLICATIONS

Riddick et al, Organic Solvents (3rd ed.) Wiley-Interscience, N.Y., pp. 66, 348 (1970).

Primary Examiner—Fred Teskin
Attorney, Agent, or Firm—Adduci, Mastriani, Schaumbert & Schill

[57] ABSTRACT

A process for producing polybutadiene essentially consisted of syndiotactic-1,2-polybutadiene in an aqueous medium includes a step off polymerizing diene essentially consisted of 1,3-butadiene in the presence of: (A) a catalyst composition including (a) a transition metal compound, and (b) an organometallic compound which includes a metal selected from the elements consisting off groups 1, 2, 12, and 13 of Periodic Table; (B) an initiator comprising at least one component selected from a group consisting of carbon disulfide, an isothiocyanate compound, and a xanthogenic compound; and (C) an inert organic liquid having a density of at least 1.10, thereby resultant particles of syndiotactic-1,2-polybutadiene have a diameter up to 2 min.

14 Claims, No Drawings

AQUEOUS SUSPENSION POLYMERIZATION OF 1,3-BUTADIENE TO PRODUCE SYNDIOTACTIC-1,2-POLYBUTADIENE

FIELD OF THE INVENTION

This invention relates to a suspension polymerization process for producing a polybutadiene essentially consisted of syndiotactic-1,2-polybutadiene, which is abbreviated to "SPB" hereinafter, and especially relates to an improvement off a suspension polymerization process carried out in an aqueous medium.

DESCRIPTION OF RELATED ART

SPB is a thermoplastics having wide utilities. For example, SPB is valuable as the material of films, fibers, coatings, adhesives because of its high melting point, high crystallinity, and excellent solvent resistance. SPB also can be used as a plastics or rubber modifier because of having vinyl side chains, which are quite reactive.

SPB having high melting point of at least 200° C.; and having high crystallinity has been produced by solution polymerization of 1,3-butadiene in the presence of a catalyst composition composed of a cobart compound, an organoaluminium compound $AlR_3$, and carbon disulfide (JP-B-47-19892).

JP-B-47-19893, JP-B-53-39917, JP-B-54-5436, JP-B-56-18128, JP-B-56-18129, JP-13-56-18130, and JP-B-56-18005 show that a SPB having a melting point of 70° to 200° C. can be obtained by incorporating alcohol, nitrile, aidehyde, ketone, linear or cyclic amine, phosphate, or sufoxide into the catalyst.

JP-A-58-34817, JP-B-61-38722, JP-B-61-38723, JP-B-6-28683, and JP-A-61-23611 disclose that SPB can be also obtained by polymerization in the presence of a catalyst composed of a cobalt compound, an organoaluminium compound represented by the formula of $R_nAlx_{3-n}$ (n represents an integer of from 1 to 3), and a compound selected from the group consisting carbon disulfide, phenyl isothiocyanate, and xanthogenic compounds.

However, it has become clear that the solution polymerization process had a problem that jelly-like SPB particles precipitate as the polymerization reaction proceeds. Due to the precipitation, much energy was required to agitate the solution, and the heat exchange efficiency between the reactor or the heat exchanger and the solution went down.

There was another problem in the solution polymerization that an energy-consuming flash evaporating process was necessary to evaporate the solvent to obtain SPB.

A suspension polymerization process of SPB in an aqueous medium was provided to solve above mentioned problem solution polymerization.

For example, J. N. Henderson et. al. provided a process of polymerizing 1,3-butadiene in an aqueous medium in the presence of a catalyst composed of a Co compound and an organoaluminium, which is encapsulated in a polyene product i.e. an oligomer of 1,3-butadiene. In the process, the catalyst was prepared by contacting Co compound and organoaluminium compound with 1,3-butadine (U.S. Pat. No. 4,429,085, U.S. Pat. No. 4,506,031). J. N. Henderson el. al. also provided a process for providing a SPB latex (U.S. Pat. No. 4,902,741). In this process, an emulsifier, i.e., a surfactant, was incorporated in the reaction mixture.

The inventors have found that the suspension process J. N. Henderson el. al. also had a problem that 30% by weight or more of SFB particles produced had a large diameter of 2 mm or more and that those particles had a jelly-like structure. Heat generated by polymerization reaction would not be effectively removed from such large particles, and the heat would accumulate in the particles. The heat might make the SPB in the large particle crosslinked.

Generation of large particles might be avoided by agitating the polymerization suspension vigorously; however, much energy is required to agitate the polymerization suspension so vigorously.

Summary of The Invention

An object of the present invention is to provide an aqueous suspension polymerization process to give particles essentially consisting of SPB, which are sufficiently small.

The process of this invention is a process for producing polybutadiene essentially consisted of SPB in an aqueous medium(E).

According to one aspect of the invention, there is provided a process for producing polybutadiene essentially consisted of syndiotactic-1,2-polybutadiene in an aqueous medium, comprising a step of polymerizing diene essentially consisted of 1,3-butadiene in the presence of:

(A) a catalyst composition comprising
 (a) a transition metal compound, and
 (b) an organometallic compound which includes a metal selected from the elements consisting of groups 1, 2, 12, and 13 of Periodic Table;

(B) an initiator comprising at least one compound selected from the group consisting of carbon disulfide, an isothiocyanate compound, and a xanthogenic compound; and (C) an inert organic liquid having a density of at least 1.10.

This invention also relates to a process comprising a step of polymerizing a monomeric diene in an aqueous medium the presence of:

(A) a catalyst composition comprising
 (a) a transition metal compound, and
 (b) an organometallic compound which includes a metal selected from the elements consisting of groups 1, 2, 12, and 13 of Periodic Table;

(B) an initiator comprising at least one component selected from a group consisting of carbon disulfide, an isothiocyanate compound, and a xanthogenic compound;

(C) an inert organic liquid having a density of at least 1.10; and (D) at least one or the organic compounds selected from a group consisting of alcohols, aldehydes, ketones, esters, and nitriles.

The object of this invention is to provide uniform, small particles of polybutadiene essentially consisting of SPB, and most of the particles having a diameter up to 2.0 mm.

The polybutadiene particles obtained by the process of this invention can be incorporated into an elastomer composition or into a plastic composition to improve its mechanical strength. The particles may be mixed with consisting and/or plastics to provide a polymer alloy.

The suspension of polybutadiene essentially consisting of SPB obtained in this process can be employed as an adhesive, a paint vehicle, or an ingredient of an asphalt compound.

DETAILED DESCRIPTION OF THE INVENTION

The process of the present invention is carried out in accordance with the procedure mentioned below.

First, the catalyst composition(A) is prepared. The catalyst composition(A) can be prepared by the steps of;
(i) contacting a transition metal compound(a) and an organometallic compound(b) with a conjugated diene (i.e. a diene compound having conjugated double bonds), then,
(ii) allowing the mixture to stand for 1 to 30 minutes, preferably 5 to 20 minutes, more preferably 5 to 15 minutes.

The transition metal compound (a) and the organometallic compound (b) are contacted with the conjugated diene to prevent the catalyst compound (a) from decomposing by water. Contacting the transition metal compound (a) and the organometallic compound (b) with the diene compound, is believed to encapsulate these compounds containing metals in a diene compound. The transition metal atom of the transition metal compound (a) is thought to be encapsulated into conjugated diene product, which might be the conjugated diene itself or an oligomer of the conjugated diene.

Those steps are preferably carried out at a temperature of $-60°$ to $50°$ C., more preferably, at a temperature of $-30°$ to $40°$ C.

The transition metal compound (a) and the organometallic compound (b) can be contacted with a conjugated diene only by mixing the transition compound (a) and the organometallic compound (b) with the conjugated diene.

Then, the catalyst composition (A) is introduced into an aqueous medium (E). Then, the initiator (B) and the inert organic liquid (C) are introduced into the aqueous medium (E) to initiate polymerizing the monomeric diene.

Alternatively, the initiator (B) can be previously introduced into the aqueous medium (E) instead of introducing the initiator after the catalyst composition (A) is added to the aqueous medium. The compound (C) also can be previously introduced into the aqueous medium (E).

The term "monomeric diene" means a diene which provides a polymer essentially consisted of polybutadiene. The monomeric diene can be either charged into the catalyst composition (A) as a "conjugated diene" or previously introduced into the aqueous medium (E).

The initiator (B) is a necessary compound, which works together with the catalyst composition (A) to polymerize the monomeric diene into a polybutadiene essentially consisting of SPB.

The inert organic liquid (C) is an organic compound which substantially does not react with the catalyst composition (A) or monomeric diene. The inert organic liquid (C) is liquid at a polymerization temperature, and the inert organic liquid (C) has a density of at least 1.10. The presence of the component (C) in the polymerization medium makes resultant polybutadiene particles small, and the particles having a diameter not less than 1 mm are up to 2.0% by weight of all particles. Without the component (C), fine, regular polybutadiene particles cannot be provided.

The aqueous medium (E) comprises water and dispersants. The same dispersants as employed in standard suspension polymerization can be used; therefore, polyvinyl alcohol, inorganic salts such as $CaCl_2$, $Ca(H_2PO_2)_2$, $Na_3PO_3$, $Na_2HPO_3$, and $NaH_2PO_3$, and/or a surfactant can be used as a dispersant.

A polymerization reaction is preferably performed at a temperature of from $-60°$ to $100°$ C., more preferably from to $70°$ C., most preferably from $-0°$ to $50°$ C.

Polymerization can be carried out in the presence of an alcohol, aidehyde, ketone, ester, and/or nitrile so that the melting point of the resultant SPB particles can be adjusted from $70°$ C. to $200°$ C.

Compounds that can be employed as the transition metal compound (a), the organometallic compound (b), initiator (B), inert organic liquid (C), alcohols or other compounds (D) are mentioned below.

Co compounds, Ti compounds, and/or Ni compounds can be used as the transition metal compound (a), and Co compounds are particularly preferable. The Co compounds include, for example, $\beta$-diketone complex off Co, $\beta$-keto acid complex or Co, $\beta$-leto acid ester complex of Co, Co carboxylate, Co halide, Co halide complex containing at least one compound selected from the group consisting of of tertiary amine alcohols, alcohols, tertiary phosphines, ketones, pyridine, alkylpyridines, piperidine, and N,N'-dialkyl amide. Especially, cobalt bis (acetylacetonate), cobalt tris (acetylacetonate), cobalt ethylacetoacetate, cobalt bromide-triphenylphosphine complex, cobalt chloride-pyridine complex, cobalt chloride-$\beta$-picoline complex, cobalt chloride-ethylalcohol complex, cobalt octate, cobalt heptate, cobalt caproate, cobalt nonate, cobalt naphtate, cobalt benzoate, cobalt malonate are preferable. A Co complex refers to a coordination compound of cobalt in which ligands are coordinated to the cobalt atom.

A Ti compound such as $TiCl_3$ or $TiCl_4$, and a Ni compound such as nickel acetylacetonate also can be employed as the transition metal compound (a).

An organometallic compound which includes the element of group 1 of Periodic Table, which corresponds to alkaline metals, group 2 of the Periodic Table, which corresponds to alkaline earth metals, group 12 of the Periodic Table including Zn, and group 13 of the Periodic Table, which corresponds to B, Al, Ga, In, and Tl can be used as the organometallic compound (b). The organometallic compound preferably includes an element selected from the group consisting of lithium, magnesium, aluminum, and zinc. Particularly, organolithium compounds, organomagnesium compounds, organozinc compounds, and/or organoaluminum compounds can be used. Among those compounds, alkyllithium, dialkylzinc, trialkylaluminum, dialkylaluminum halide, alkylaluminum sesquihalide, monoalkylaluminum dihalide are especially preferable. The most preferable compounds are butyl lithium, diethylzinc, a Grignard reagent such as methylmagnesium bromide, ethylmagnesium bromide, benzylmagnesium bromide, or phenylmagnesium bromide, trimethylaluminum, triethylaluminum, dimethylaluminum chloride, diethylaluminum bromide, methylaluminum sesquichloride, methylaluminum sesquibromide, ethylaluminum sesquichloride, ethylaluminum sesquibromide, methylaluminum dichloride, methylaluminum dibromide, ethylaluminium dichloride, and ethylaluminium dibromide.

The initiator includes:
Carbon disulfide;

isothiocyanate compound, for example, alkyl isocyante, methyl isothiocyanate, ethyl isothiocyanate, n-propyl isothiocyanate, iso-propyl isothiocyanate, n-butyl isothiocyanate, sec-butyl isothiocyanate, tert-butyl isothiocyanate, iso-butyl isothiocyanate, n-amyl isothiocyanate, sec-amyl isothiocyanate, tert-amyl isothiocyanate, iso-amyl isothiocyanate, allyl isothiocyanate, phenyl isothiocyanate, and benzyl isothiocyanate: and xanthogenic compounds, for example, xanthoaenic acid, for example, methyl xanthoaenic acid, ethyl xanthoaenic acid, n-propyl xanthogenic acid, iso-propyl xanthogenic acid, n-butyl xanthogenic acid, sec-butyl xanthogenic acid, tert-butyl xanthogenic acid, iso-butyl xanthogenic acid, n-amyl xanthogenic acid, sec-amyl xanthogenic acid, tert-amyl xanthogenic acid, iso-amyl xanthogenate, n-hexyl xanthogenic acid, sec-hexyl xanthogenic acid, tert-hexyl xanthogenic acid, iso-hexyl xanthogenic acid, n-heptyl xanthogenic acid, sec-heptyl xanthogenic acid, tert-heptyl xanthogenic acid, n-octyl xanthogenic acid, sec-octyl xanthogenic acid, tert-octyl xanthogenic acid, iso-octyl xanthogenic acid, phenyl xanthogenic acid, tolyl xanthogenic acid, xylyl xanthogenic acid, benzyl xanthogenic acid, and methyl benzyl xanthogenic acid:

an alkaline metal salt of the above-mentioned xanthogenic acids; and a xanthogenic disulfide, for example, methyl xanthogen sulfide, ethyl xanthogen sulfide, n-propyi xanthogen sulfide, iso-propyl xanthogen sulfide, n-butyl xanthogen sulfide, sec-butyl xanthogen sulfide, tert-butyl xanthogen sulfide, iso-butyl xanthogen sulfide, n-amyl xanthogen sulfide, sec-amyl xanthogen sulfide, tert-amyl xanthogen sulfide, iso-amyl xanthogen sulfide, n-hexyl xanthogen sulfide, sec-hexyl xanthogen sulfide, tert-hexyl xanthogen sulfide, iso-hexyl xanthogen sulfide, n-heptyl xanthogen sulfide, sec-heptyl xanthogen sulfide, tert-heptyl xanthogen sulfide, n-octyl xanthogen sulfide, iso-octyl xanthogen sulfide, phenyl xanthogen sulfide, tolyl xanthogen sulfide, xylyl xanthogen sulfide, benzyl xanthogen sulfide, and methyl benzyl xanthogen sulfide.

Organic compounds preferable for the inert organic liquid (C) include, for example, methylene chloride, tetrachloromethane, chloroform, bromoform, trichloroethylene, chlorobenzene, bromobenzene, chlorotoluene, bromotoluene, dichlorobenzene, dibromobenzene, hexachlorobenzene, hexafluorobenzene, chlorophenol, bromophenol, pentachlorophenol, pentachlorophenol, sulfoxide such as dimethyl sulfoxide, dimethyl sulfuric acid, diethyl sulfuric acid. A halogenated hydrocarbon is preferably used as an inert organic liquid (C).

The alcohol, aidehyde, ketone, ester, and nitrile (D) that can be incorporated into the SPB particles to vary its melting point include, for example, as alcohols, for example, methyl alcohol, ethyl alcohol, n-propyl alcohol, iso-propyl alcohol, n-butyl alcohol, sec-butyl alcohol, tert-butyl alcohol, iso-butyl alcohol, n-amyl alcohol, sec-amyl alcohol, tert-amyl alcohol, iso-amyl alcohol, hexyl alcohol, heptyl alcohol, octyl alcohol, cyclopentyl alcohol, cyclohexyl alcohol, cyclododecyl alcohol, benzyl alcohol, diphenyl carbinol, cynnamyl alcohol, o-anise alcohol, m-anise alcohol, and p-anise alcohol;

as ketones, for example, acetone, acetyl acetone, methyl ethyl ketone, methyl propyl ketone, iso-propyl methyl ketone, butyl methyl ketone, iso-butyl methyl ketone, pinacolone, diethyl ketone, butyrone, di-isopropyl ketone, di-isobutylketone, cycloheptanone, cyclohexanone, cyclopentanone, cyclododecanone, acetophenone, propiophenone, butyrophenone, valerophenone, benzophenone, dibenxyl ketone, and acetonaphtone;

as aldehydes, for example, formaldehyde, acetoaldehyde, propionaldehyde, butylaLdehyde, isobutylaldehyde, valeraldehyde, isovaleraldehyde, pivalic aidehyde, caproic adehyde, heptaldehye, caprilic aldehyede, pelargoaldehyde, capric aldehyde, undecylaldehyde, lauric aldehyde, tridecyialdehyde, mistinic aldehyde, pentadecylaldehyde, palmitic aldehyde, stearyl aidehyde, glyoxyal, succinic aldehyde, benzaldehyde, o-toluaidehyde, m-tolualdehyde, p-tolualdehyde, salicylaldehyde, α-naphthaldehyde, β-naphthaldehyde, γ-naphthaldehyde, o-anisealdehyde, m-anisealdehyde, p-anisealdehyde, and cinnamaldehyde;

ester, for example, acetate ester, propionate ester, butyrate ester, valerate ester, caproic ester, enanthic ester, caprilic ester, pelargonic ester, undecylate ester, α-crotonic ester, β-crotonic ester, cis-crotonic ester, undecylate ester, oleic ester, benzoic ester, phenylacetate ester, and acetoacetate ester; and as nitriles, for example, acetonitrile, benzonitrile, acrylonitrile, and propionitrile.

Compounds that can be used as the conjugated diene are 1,3-butadiene, isoprene or 2-methyl-1,3-butadiene, myrcene or 7-methyl-3-methylene-1,6-octadiene, or a mixture of them.

The diene compounds mentioned above can be employed as the monomeric diene. A hydrocarbon mixture containing 70% by weight or more of 1,3-butadiene also can be used as the monomeric diene.

The amount of each of the compounds used in the process of each of this invention is as follows.

The amount of the transition metal compound (a) is preferably 0.00001 to 0.01 mol, more preferably 0.0005 to 0.01 mol, most preferably 0.001 to 0.01 mol per 1 mol of diene compound, which is introduced into the aqueous medium (E) as the monomeric diene and the conjugated diene.

The amount of the organometallic compounds (b) is preferably 0.1 to 500 mol, more preferably 0.50 to 50 mol, most preferably 1.0 to 10 mol per 1 mol of the transition metal compound (a).

The molar ratio of the initiator (B) to the transition metal compound (a) is preferably 1.0 or more.

The volume ratio of 1,3-butadiene to water in the aqueous medium (E) is preferably 0.01 to 10.0, more preferably 0.1 to 5.0, most preferably 0.1 to 2.0.

The amount of the inert organic liquid (C) is preferably 10 to 100 parts by volume, more preferably 20 to 100 parts, most preferably 40 to 100 parts per 100 parts by volume of the diene compound in the aqueous medium.

EXAMPLES

This invention is illustrated by the following examples, which are intended merely to illustrate preferable embodiments and not to be regarded as limiting the scope of this invention or the manner in which it can be practiced.

EXAMPLE 1

(1) Catalyst composition preparation 240 ml (2.73 mol) of 1,3-butadiene, 1.6 ml of a solution of cobalt octate in heptane in which 0.5 mol of cobalt octate was dissolved in 1 litter of heptane, and 2.4 ml of a solution of triethylaluminium in heptane (1 mol of triethyl aluminium was dissolved in 1 liter of heptane) were introduced into a 300 ml autoclave which was purged with nitrogen gas in advance, then the mixture was stirred at a speed of 500 revolutions per minute (r.p.m.) at room temperature for 10 minutes.

(2) Polymerization reaction

Water was purified by ion exchange and then nitrogen was bubbled. 560 ml of the water, 120 ml of methylene chloride, 0.56 g of polyvinyl alcohol were introduced into a 1.5 liter autoclave equipped with an anchor-type stirrer. The autoclave was purged with nitrogen gas in advance. Then, the catalyst composition mentioned above and 1.6 mol of carbon disulfide were added to the autoclave to initiate a polymerization reaction. The polymerization reaction was carried out at 30° C. for 1 hour. While polymerizing 1,3-butadiene, the mixture was stirred at a speed of 600 r.p.m. Then, the mixture was poured into a solution of 1% 2,6-di-tertiarybutyl-4-methyl-phenol (BHT) in methanol, then SPB particles were picked up and dried in a vacuum oven at 50° C. for 24 hours. 127 g off SPB particles were obtained. The yield was 86.1%. The obtained SPB particles had a melting point of 199.7° C.

Then, the particles were screened to sort them out by their size. Only 1.5% by weight of the particles had a diameter of 1.0 mm or more, and only 1.8 g of SPB adhered to the inner wall of the autoclave and on the stirrer. The result is shown in table 1.

COMPARATIVE EXAMPLE 1

Except that polymerization was performed without methylene dichloride, the catalyst composition preparation and the polymerization reaction were carried out in the same manner as mentioned in the Example 1 to obtain SPB particles. 66.5 g of SPB particles were obtained. The yield was 35.7%. The obtained SPB particles had a melting point of 193.7° C. Then, the particles were screened to sort them out by their size. 62.6 % by weight of the particles had a diameter of 1 mm or more and 29.3% by weight of the particles had a diameter of 1.68 mm or more, and 13.5 g of SPB adhered to the inner wall of the autoclave and on the stirrer. The result is shown in Table 1.

EXAMPLE 2

Except that the amount off methylene dichloride was reduced to 40 ml and that 0.07 mol of cyclohexanone was incorporated into the aqueous medium, the catalyst composition preparation and the polymerization reaction were carried out in the same manner as that of Example 1. 140.2 g of SPB particles was obtained. The yield was 89.8%. The obtained SPB particles had a melting point of 150.5° C. Then, the particles were screened to sort them out by their size. 25.2% by weight of the particles had a diameter of 1.0 mm or more, and 4.7 g of SPB adhered to the inner wall of the autoclave and on the stirrer. The result is shown in Table 1.

EXAMPLE 3

Except that the amount of methylene dichloride was increased to 120 ml, the catalyst composition preparation and the polymerization reaction were carried out in the same manner as mentioned in Example 2 to obtain SPB particles. 143.8 g of SPB particles were obtained. The yield was 92.2%. The obtained SPB particles had a melting point of 169.8° C. Then, the particles were screened to sort them out by their size, 3.6% by weight of the particles had a diameter of 1.0 mm or more, and only 2.3 g of SPB adhered to the inner wall of the autoclave and on the stirrer. The result is shown in Table 1.

EXAMPLE 4

Except that the amount of methylene dichloride was increased to 240 ml, the catalyst composition preparation and the polymerization reaction were carried out in the same manner as mentioned in Example 2 to obtain SPB particles. 139.5 g of SPB particles were obtained. The yield was 89.4%. The obtained SPB particles had a melting point of 178.7° C. Then, the particles were screened to sort them out by their size. 10.2% by weight of the particles had a diameter of 1.0 mm or more, and only 2.1 g of SPB adhered to the inner wall of the autoclave and on the stirrer. The result is shown in Table 1.

COMPARATIVE EXAMPLE 2

Except that 0.07 mol of cyclohexanone was added to the aqueous medium, the catalyst composition preparation and the polymerization reaction were carried out in the same manner as mentioned in the Comparative Example 1. 142.3 g of SPB particles was obtained. The yield was 91.2%. The obtained SPB particles had a melting point off 144.8° C. Then, the particles were screened to sort them out by their size. 55.9% by weight of the particles had a diameter of 1 mm or more and 40.2% by weight of the particles had a diameter of 1.68 mm or more, 4.4 g of SPB adhered to the inner wall of the autoclave and on the stirrer. The result is shown in Table 1.

EXAMPLE 5

Except that 0.68 tool of cyclohexanone was added to the aqueous medium, the catalyst composition preparation and the polymerization reaction were carried out in the same manner as mentioned in the Example 1. 128 g off SPB particles was obtained. The yield was 86.5%. The obtained SPB particles had a melting point of 120.6° C. Then, the particles were screened to sort them out by their size. Only 0.2% by weight of the particles had a diameter of 1.0 mm or more, and particles having a diameter of 1.68 mm or more were not obtained. Only 4.1 g of SPB adhered to the inner wall of the autoclave and on the stirrer. The result is shown in Table 1.

EXAMPLE 6

Except that 0.53 mol of ethylacetate was added instead of cyclohexanone to the aqueous medium, the catalyst composition preparation and the polymerization reaction were carried out in the same manner as mentioned in Example 5. 120.7 g of SPB particles were obtained. The yield was 81.7%. The obtained SPB particles had a melting point of 129.0° C. Then, the particles were screened to sort them out by their size. Only 0.2% by weight off the obtained particles had a diameter of 1.0 mm or more, and particles having a diameter of 1.68 mm or more were not obtained. 0.2 g of SPB adhered to the inner wall off the autoclave or the stirrer. The result is shown in Table 1.

EXAMPLE 7

Except that 0.25 mol of anisaldehyde was added instead of cyclohexanone to the aqueous medium, the catalyst composition preparation and the polymerization reaction were carried out in the same manner as mentioned in the Example 5. 126.3 g of SPB particles were obtained. The yield was 85.6%. The obtained SPB particles had a melting point of 129.0° C. Then, the particles were screened to sort them out by their size. Only 0.2% by weight of the obtained particles had a diameter of 1.0 mm or more, and particles having a diameter of 1.68 mm or more were not obtained. 2.7 g of SPB adhered to the inner wall of the autoclave or the stirrer. The result is shown in Table 1.

EXAMPLE 8

Except that 0.49 mol of benzaldehyde was added instead of cyclohexanone to the aqueous medium, the catalyst composition preparation and the polymerization reaction were carried out in the same manner as mentioned in the Example 5. 141.0 g of SPB particles were obtained. The yield was 95.7%. The obtained SPB particles had a melting point of 129.5° C. Then, the particles were screened to sort them out by their size. Only 0.5% by weight off the obtained particle had a diameter of 1.0 mm or more, and particles having a diameter of 1.68 mm or more were not obtained. 6.3 g of SPB adhered to the inner wall of the autoclave or the stirrer. The result is shown in Table 1.

EXAMPLE 9

Except that 0.55 mol of butyl alcohol was added instead of cyclohexanone to the aqueous medium, the catalyst composition preparation and the polymerization reaction were carried out in the same manner as mentioned in Example 5. 119.3 g of SPB particles were obtained. The yield was 80.8%. The obtained SPB particles had a melting point of 144.2° C. Then, the particles were screened to sort them out by their size. Only 0.5% by weight off the obtained particles had a diameter of 1.0 mm or more, and particles having a diameter of 1.68 mm or more were not obtained. 6.1 g of SPB adhered to the inner wall of the autoclave or the stirrer. The result is shown in Table 1.

EXAMPLE 10

Except that 0.49 mol of benzyl alcohol was added instead of cyclohexanone to the aqueous medium, the catalyst composition preparation and the polymerization reaction were carried out in the same manner as mentioned in Example 5. 143.4 g of SPB particles were obtained. The yield was 91.9%. The obtained SPB particles had a melting point of 153.1° C. Then, the particles were screened to sort them out by their size. Only 0.4% by weight of the obtained particles had a diameter of 1.0 mm or more, and particles having a diameter of 1.68 mm or more were not obtained. 7.8 g of SPB adhered to the inner wall of the autoclave or the stirrer. The result is shown in Table 1.

EXAMPLE 11

Except that 0.24 mol of hexyl alcohol was added instead of cyclohexanone to the aqueous medium, the catalyst composition preparation and the polymerization reaction were carried out in the same manner as mentioned in Example 5. 136.3 g of SPB particles was obtained. The yield was 87.4%. The obtained SPB particles had a melting point of 149.7° C. Then, the particles were screened to sort them out by their size. Only 0.1% by weight of the obtained particles had a diameter of 0.5 mm to 1.0 mm or more, and particles having a diameter of 1.0 mm or more were not obtained. 0.1 g of SPB adhered to the inner wall of the autoclave or the stirrer. The result is shown in Table 1.

COMPARATIVE EXAMPLE 3

Except that polymerization was performed without methylene dichloride, the catalyst composition preparation and the polymerization reaction were carried out in the same manner as mentioned in Example 5, to obtain SPB particles. 137.6 g of SPB particles were obtained. The yield was 93.2%. The obtained SPB particles had a melting point of 120.0° C. Then, the particles were screened to sort them out by their size. 56.9% by weight of the particles had a diameter of 1.0 mm or more, and 15.0% by weight of the particles had a diameter off 1.68 mm or more. 7.0 g of SPB adhered to the inner wall of the autoclave and on the stirrer. The result is shown in Table 1.

COMPARATIVE EXAMPLE 4

Except that polymerization was performed without methylene dichloride, the catalyst composition preparation and the polymerization reaction were carried out in the same manner as mentioned in Example 6, to obtain SVB particles. 126.4 g off SPB particles were obtained. The yield was 81.0%. The obtained SPB particles had a melting point of 121.0° C. Then, the particles were screened to sort them out by their size. 45.2% by weight of the particles had a diameter of 1.0 mm or more, and 28.2% by weight of the particles had a diameter of 1.68 mm or more. 15.3 g of SPB adhered to the inner wall of the autoclave and on the stirrer. The result is shown in Table 1.

TABLE 1

| | 1 | 2 | 3 | 4 | 5 | 6 | 7 | 8 | 9 | 10 | 11 | Comparative Example 1 | 2 | 3 | 4 |
|---|---|---|---|---|---|---|---|---|---|---|---|---|---|---|---|
| Amount of CH$_2$Cl$_2$ | 120 | 40 | 120 | 240 | 120 | 120 | 120 | 120 | 120 | 120 | 120 | 0 | 0 | 0 | 0 |
| Ingredient (D) | none | cyclohexanone | cyclohexanone | cyclohexanone | cyclohexanone | ethylacetate | p-anisaldehyde | benzaldehyde | n-butylalcohol | benzylalcohol | hexanol | none | cyclohexanone | cyclohexanone | ethylacetate |
| Amount of (D) (mol) | 0 | 0.07 | 0.07 | 0.07 | 0.68 | 0.53 | 0.25 | 0.49 | 0.55 | 0.49 | 0.24 | 0 | 0.07 | 0.68 | 0.53 |
| SPB Conversion (%) | 86.1 | 89.8 | 92.2 | 89.4 | 86.5 | 81.7 | 85.6 | 95.7 | 80.8 | 91.9 | 87.4 | 35.7 | 91.2 | 93.2 | 181.0 |
| m.p. of SPB (°C.) | 199.7 | 150.5 | 169.8 | 178.7 | 120.6 | 129.0 | 129.0 | 129.5 | 144.2 | 153.1 | 149.7 | 193.7 | 144.8 | 120.0 | 121.0 |
| Particle diameter distribution | | | | | | | | | | | | | | | |
| $\phi < 0.3$ mm | 28.4 | 44.4 | 32.2 | 26.0 | 93.4 | 86.7 | 89.9 | 67.8 | 71.6 | 62.1 | 96.2 | 17.4 | 25.3 | 11.9 | 3.5 |
| $0.3 \leq \phi$ | 24.5 | 20.2 | 14.7 | 10.1 | 1.5 | 11.7 | 7.0 | 23.6 | 19.5 | 27.4 | 3.6 | 3.9 | 9.3 | 12.1 | 21.3 |

TABLE 1-continued

| | 1 | 2 | 3 | 4 | 5 | 6 | 7 | 8 | 9 | 10 | 11 | Comparative Example | | | |
|---|---|---|---|---|---|---|---|---|---|---|---|---|---|---|---|
| | | | | | | | | | | | | 1 | 2 | 3 | 4 |
| <0.5 mm 0.5 ≦ φ <1.0 mm | 43.9 | 10.2 | 47.2 | 51.7 | 0.8 | 1.3 | 0.4 | 1.8 | 2.4 | 2.2 | 0.1 | 2.6 | 5.1 | 12.1 | 14.7 |
| 1.0 ≦ φ <1.68 mm | 1.5 | 8.2 | 2.6 | 8.6 | 0.2 | 0.2 | 0.2 | 0.5 | 0.5 | 0.4 | 0.0 | 33.3 | 15.7 | 41.9 | 17.0 |
| 1.68 ≦ φ | 0.0 | 17.0 | 1.0 | 1.6 | 0.0 | 0.0 | 0.0 | 0.0 | 0.0 | 0.0 | 0.0 | 29.3 | 40.2 | 15.0 | 28.2 |
| Amount of particles adhered | 1.8 | 4.7 | 2.3 | 2.1 | 4.1 | 0.2 | 2.7 | 6.3 | 6.1 | 7.8 | 0.1 | 13.5 | 4.4 | 7.0 | 15.3 |

What is claimed is:

1. A process for producing polybutadiene essentially consisting of syndiotactic-1,2-polybutadiene in an aqueous medium, comprising a step of polymerizing diene essentially consisting of 1,3-butadiene in the presence of:
   (A) a catalyst composition comprising
      (a) a transition metal compound, and
      (b) an organometallic compound which includes a metal selected from groups 1, 2, 12 and 13 of Periodic Table;
   (B) an initiator comprising at least one component selected from the group consisting of carbon disulfide, an isothiocyanate compound, and a xanthogenic compound; and
   (C) 20 to 100 parts by volume per 100 parts by volume of the diene of an inert organic liquid consisting essentially of a halogenated hydrocarbon.

2. A process of claim 1 wherein the catalyst composition (A) is prepared by contacting the 1,3-butadiene with the transition metal compound (a) and the organometallic compound (b).

3. A process of claim 1 which is carried out in sequence in the steps of:
   (1) preparing the catalyst composition (A);
   (2) introducing the catalyst composition (A) into the aqueous medium; and
   (3) introducing the initiator (B) and the inert organic liquid (C) into the aqueous medium to initiate a polymerization reaction.

4. A process of claim 1 or 2 wherein the inert organic liquid (C) is introduced into the aqueous medium prior introducing the catalyst composition (A).

5. A process of claims 1 or 2 wherein the initiator (B) is previously introduced into the aqueous medium.

6. A process or claim 1 wherein the initiator introduced into the aqueous medium after introducing one component selected from the group consisting of the catalyst compound (A) and the inert organic liquid (C) into the aqueous medium.

7. A process of claim 1, 2, or 3 wherein the aqueous medium contains at least one compound selected from the group consisting of an inorganic salt, poly vinylalcohol, and a surfactant.

8. A process of claim 1, 2, or 3 wherein the transition metal compound (a) is at least one compound selected from the group consisting of Co compounds, Ti compounds, and Ni compounds.

9. A process of claim 8 wherein the transition metal compound (a) comprises a Co compound.

10. A process of claim 9 wherein the transition metal compound (a) is a Co compound selected from the group consisting of
   (a) β-diketone complex of Co,
   (b) β-keto acid complex of Co,
   (c) β-keto acid ester complex of Co,
   (d) carboxylate salt of Co,
   (e) Co halide,
   (f) Co halide complex having at least one element selected from the group consisting of
   tertiary amine alcohol,
   alcohol,
   tertiary phosphine,
   ketone, and
   N, N'-dimethyl amide.

11. A process of claim 1, 2, or 3 wherein the organometallic compound is an organoaluminum compound represented by the formula of $AlR_3$.

12. A process of claim 1, 2, or 3 wherein the polymerization reaction is carried out in the presence of at least one compound selected from the group consisting of alcohol, aldehyde, ketone, ester, and nitrile.

13. A process of claim 1, 2, or 3 wherein an amount of the inert organic liquid (C) is 40 to 100 parts by volume per 100 parts by volume of the diene in the polymerization medium.

14. A process of claim 1, 2, or 3, wherein the inert organic liquid (C) is a halogenated hydrocarbon selected from the group consisting of methylene chloride, chloroform, carbon tetrachloride, methylene bromide, bromoform, trichlorothylene, bromobenzene, bromotoluene, dichlorobenzene and dibromobenzene.

* * * * *